April 5, 1932. W. W. DE LANEY 1,853,016
METHOD OF MAKING BATHING CAPS AND THE LIKE
Filed Dec. 23, 1930
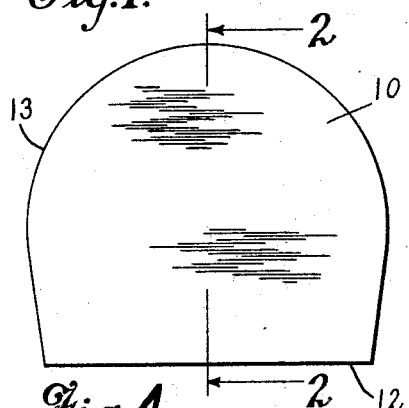
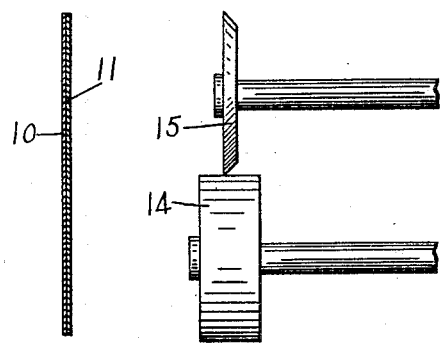
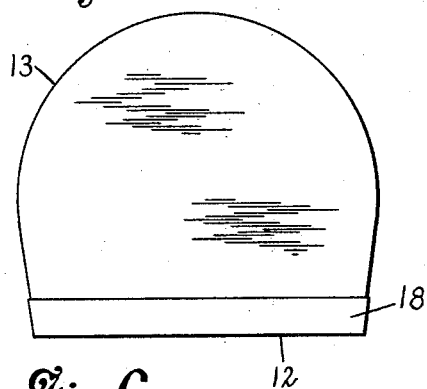
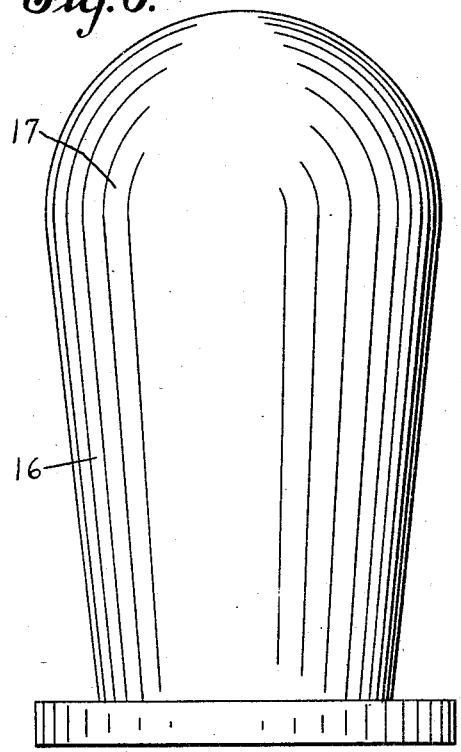
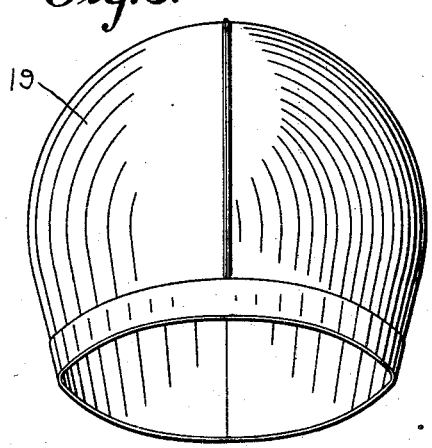
Inventor
Wallace W. De Laney
By Rockwell & Bartholow
Attorneys Patented Apr. 5, 1932

1,853,016

UNITED STATES PATENT OFFICE

WALLACE W. DE LANEY, OF NEW HAVEN, CONNECTICUT, ASSIGNOR TO THE SEAMLESS RUBBER COMPANY, OF NEW HAVEN, CONNECTICUT

METHOD OF MAKING BATHING CAPS AND THE LIKE

Application filed December 23, 1930. Serial No. 504,335.

This invention relates to the manufacture of hollow rubber articles such as bathing caps or the like, and more particularly to a method of manufacture of such articles whereby they may be given the desired form and shape during the manufacture thereof, and not be made in merely flat condition so that considerable stretching of certain parts of the article is necessary when it is used. For instance, in the manufacture of bathing caps for example, it is quite common to make the caps of flat or sheet stock, the stock being cut to the desired shape so that each piece constitutes one-half of the cap. These two pieces are secured together and the cap is then banded and trimmed and the rubber is cured to complete the operation. The resulting cap is not formed, but on the contrary will lie substantially flat, the two halves abutting each other. When such a cap is worn, it will be obvious that considerable stretching of certain portions thereof is required, as a result of which the cap may be more or less tight and uncomfortable.

In some instances formed or round caps have been made, but these are usually molded. In this process the rubber stock is placed in the mold in two or more pieces and a core is used about which the parts of the cap are assembled, the core giving to the completed article its hollow, round shape as distinguished from the flat shape which results from what may be termed the mechanical process described above. The molded caps are, however, more or less heavy and stretch less easily than those of the unmolded type so that they possess certain undesirable qualities.

One object of this invention is the provision of a method of manufacture of fashioned or formed hollow rubber articles which will possess the advantages of the unmolded or mechanically made articles and at the same time will be given the desired shape or form which has, in the past, been obtainable only by molding.

Another object of the present invention is the provision of a light, full-fashioned or round bathing cap manufactured from sheet rubber stock so that it will be light and very elastic and at the same time may be economically produced.

A still further object of the invention is the provision of a method of making hollow rubber articles such as bathing caps wherein the article may be first made of uncured sheet rubber stock, fashioned to shape by being fitted to a form made for the purpose and then cured upon the form so that, in the case of a bathing cap, a light economical article is produced which may be worn with great comfort, and which is of the desired shape to fit the head of the wearer.

To these and other ends, the invention consists in the novel features and combinations of steps to be hereinafter described and claimed.

In the accompanying drawings:

Fig. 1 is a view of a bathing cap blanked out from sheet rubber stock;

Fig. 2 is a cross-sectional view on line 2—2 of Fig. 1;

Fig. 3 is a view showing the seaming rolls used to secure the two halves of the blanked cap together;

Fig. 4 is a view of the cap after it has been seamed and banded;

Fig. 5 is a view of the form upon which the cap is mounted and fitted to be cured, and Fig. 6 is a view of the completed cap.

While I have chosen to illustrate a preferred application of the present method to the manufacture of bathing caps, it will be understood that the novel features of the invention may be employed in the manufacture of other hollow rubber articles as well.

In the manufacture of the bathing cap illustrated in the drawings, the raw or unvulcanized rubber, as it comes in somewhat rough sheets, is passed through a calender so that the stock may be reduced to sheets of the desired and uniform thickness. These sheets are usually run off from the calenders in rolls.

In the present method the stock is cut into pieces from the rolls and the pieces are piled up and left in piles to shrink on trays. A form or pattern is then placed upon these piles and an electric knife is run about the pattern to cut the stock in the piles to the desired shape shown in Fig. 1 at 10. The blank 10 represents, of course, one-half of the material to be used in making the cap, and as shown in Fig. 2, the second half 11 lies immediately below the upper half 10. It will, or course, be understood that the cap may be made of more than two pieces if desired, but I have shown a two-piece cap as merely illustrative of the improved method.

With reference to Fig. 1, the bottom of the cap 12 will be left open, but the edge 13 will be entirely closed. The closing of the edge 13 is accomplished by means of what is known as a seaming cutter consisting of the rolls 14 and 15 shown in Fig. 3. The cutting roll 15, as is shown, is beveled to cut the edges 13 of the blanks 10 and 11 and seam them together in a well-known manner.

The band 18 shown in Fig. 4 is placed about the cap at this time, and any trimming which is desired to be done before the curing of the cap may also be performed. The cap is now ready to be placed upon a proper form for curing.

The resulting article is a flat hollow cap which is closed except at the bottom edge 12. This cap is then placed over the form 16 shown in Fig. 5 after it has been well dusted so that it may be placed on the form with comparative facility. It will be seen that adjacent its upper end, particularly at about the portion designated by the character 17, the form is of larger diameter than it is below this point, and it will also be understood that the form is of substantially circular shape in horizontal cross-section. It will be apparent, therefore, that when the cap is slipped over the form, it will be necessary for the open end thereof to be stretched to some extent to go over the large part of the form. The rubber is at this time in uncured condition and, as is well-known, rubber in such condition lacks elasticity in that it will not return to shape after having been stretched. The natural inference would be, therefore, that the cap in this condition could not be made to fit the form perfectly but particularly at the lower edges would hang loosely about the surface of the form after it had been stretched to pass over the largest portion thereof.

I have found, however, that by pressure from the hands of the operator and by working or kneading the cap and pressing it against the form, it can be made to fit the form accurately and smoothly at all points. It will, if treated in this manner, shape itself to the form to such an extent that it is not necessary for it to be glued or secured thereupon during the curing operation.

The curing is accomplished while the cap is upon the form 16 and may be carried out by means of a dry heater or a steam vulcanizer, or by any other suitable method such for example as an acid curing. For instance, the forms 16 with the caps thereon may be placed in a vulcanizer and heat applied to effect the proper curing of the raw rubber.

The completed cap shown at 19 in Fig. 6 can then be readily removed from the form after the cure has been completed. It will be apparent that this cap will retain the shape given it upon the form, and will be round or full-fashioned, and not lie flat as it was in the uncured condition before being placed upon the form 16.

While it may be said that the cap is molded to shape upon the form 16 by pressure from the hands, I do not use this term in the sense in which it is often used, that is, to refer to articles being shaped or formed by the walls of a mold. As used herein the term molded merely refers to the shaping or forming of the article by pressure against the form 16.

While I have shown and described a preferred embodiment of my invention, it will be understood that it is not to be limited to all of the details shown, but is capable of modification and variation within the spirit of the invention and within the scope of the appended claims.

What I claim is:

1. The method of making hollow rubber articles which comprises, preparing from uncured thin sheet rubber stock a hollow article closed at one end and open at the other, placing this article upon a rigid convex form, molding the article about the form by manual pressure, and then curing the article upon the form.

2. The method of making a bathing cap or the like which comprises, making the blank cap of uncured thin sheet rubber stock, placing the blank over a rigid form, fashioning the blank to fit the form tightly and smoothly by manual pressure on the blank when it is over the form, then curing the cap upon the form.

3. The method of making a fashioned bathing cap which comprises, making a flat blank cap open at one end of pieces of uncured thin sheet rubber seamed together, securing a band about the lower edge of the blank cap, stretching the blank over a form inserted through the open end of the blank, molding the blank to fit the form tightly and smoothly by manual pressure thereon while upon the form, and then curing the cap while upon the form.

4. The method of making a bathing cap which comprises, cutting from uncured thin sheet rubber stock the necessary sectional parts, securing these parts together to form a flat hollow blank opened at one end, uniting the seams between the sections while the rubber is in an uncured state, stretching the blanked cap over a rounded form larger than the blank in unstretched condition, manually pressing the blank upon the form to mold it tightly and smoothly thereabout, and then curing the cap while on the form.

5. The method of making a bathing cap which comprises, cutting from uncured sheet rubber stock the necessary sectional parts, securing these parts together to form a flat hollow blank opened at one end, uniting the seams between the sections while the rubber is in an uncured state, trimming the blank cap, stretching the blank cap over a rounded form larger than the blank in unstretched condition, manually pressing the blank upon the form to mold it tightly and smoothly thereabout, and then curing the cap while it is upon the form by introducing the form and cap into a vulcanizer to effect the cure.

6. The method of making a bathing cap which comprises, cutting from uncured sheet rubber stock the necessary sectional parts, securing these parts together to form a hollow blank cap open at one end, uniting the seams between the sections while the rubber is in an uncured state, stretching the blank cap over a convex form, manually pressing the blank upon the form to mold it tightly and smoothly thereabout, and then curing the cap while it is upon the form.

7. The method of making a bathing cap which comprises, making a blank cap open at one end of sections of uncured sheet rubber seamed together, securing a band about the lower edge of the cap, stretching the blank over a convex form smaller adjacent the open end of the cap than adjacent the closed end thereof, molding the cap to fit the form tightly and smoothly by manual pressure thereon while on the form, and then curing the cap while upon the form.

In witness whereof, I have hereunto set my hand this 16th day of December, 1930.

WALLACE W. DE LANEY.